(12) United States Patent
Kishimoto et al.

(10) Patent No.: US 9,726,049 B2
(45) Date of Patent: Aug. 8, 2017

(54) WASTE HEAT RECOVERY APPARATUS

(71) Applicant: Kobe Steel, Ltd., Hyogo (JP)

(72) Inventors: Akira Kishimoto, Kobe (JP); Ryo Fujisawa, Kobe (JP); Makoto Nishimura, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 24 days.

(21) Appl. No.: 14/772,045

(22) PCT Filed: Jan. 20, 2014

(86) PCT No.: PCT/JP2014/000258
§ 371 (c)(1),
(2) Date: Sep. 1, 2015

(87) PCT Pub. No.: WO2014/155909
PCT Pub. Date: Oct. 2, 2014

(65) Prior Publication Data
US 2016/0017761 A1    Jan. 21, 2016

(30) Foreign Application Priority Data
Mar. 25, 2013 (JP) ................ 2013-061911

(51) Int. Cl.
| | | |
|---|---|---|
| F25B 43/00 | (2006.01) | |
| F01K 23/10 | (2006.01) | |
| F01K 25/08 | (2006.01) | |
| F01K 13/02 | (2006.01) | |
| F01K 25/06 | (2006.01) | |

(52) U.S. Cl.
CPC ............. *F01K 23/10* (2013.01); *F01K 13/02* (2013.01); *F01K 25/06* (2013.01); *F01K 25/08* (2013.01)

(58) Field of Classification Search
CPC .......... F01K 25/06; F01K 25/08; F01K 13/02
See application file for complete search history.

(56) References Cited

U.S. PATENT DOCUMENTS

| | | |
|---|---|---|
| 3,636,706 A | 1/1972 | Minto |
| 4,191,021 A | 3/1980 | Nakamura et al. |

(Continued)

FOREIGN PATENT DOCUMENTS

| | | |
|---|---|---|
| JP | S05-512221 A | 1/1980 |
| JP | S55-012221 A | 1/1980 |

(Continued)

OTHER PUBLICATIONS

International Search Report for PCT/JP2014/000258 dated Apr. 8, 2014.

(Continued)

*Primary Examiner* — Elizabeth Martin
(74) *Attorney, Agent, or Firm* — Studebaker & Brackett PC

(57) ABSTRACT

Disclosed is a waste heat recovery apparatus which comprises: a gas-liquid separator; an expander into which a gaseous working medium separated by the gas-liquid separator flows; a driven machine; a condenser; a first pump; a first heater; a circulation flow passage for serially connecting the gas-liquid separator, the expander, the condenser, the first pump and the first heater in this order; a heat recovery flow passage for allowing a liquid working medium discharged from the gas-liquid separator to merge with the working medium flowing in a portion between the first heater and the gas-liquid separator in the circulation flow passage; and a second pump.

4 Claims, 1 Drawing Sheet

(56) References Cited

U.S. PATENT DOCUMENTS

| | | | | |
|---|---|---|---|---|
| 2009/0188253 A1* | 7/2009 | Smith | ................ | F01C 1/16 |
| | | | | 60/657 |
| 2011/0072818 A1* | 3/2011 | Cook | ................ | F01K 13/02 |
| | | | | 60/645 |
| 2012/0312009 A1 | 12/2012 | Smith et al. | | |

FOREIGN PATENT DOCUMENTS

| JP | S55-032938 A | 3/1980 |
|---|---|---|
| JP | S06-062611 A | 4/1985 |
| JP | S60-062611 A | 4/1985 |
| JP | SHO63-067970 U | 5/1988 |
| JP | H04-298605 A | 10/1992 |
| JP | H04-298609 A | 10/1992 |
| JP | 2006-316767 A | 11/2006 |
| JP | 2008-542629 A | 11/2008 |

OTHER PUBLICATIONS

Ho et al.; Elsevier Ltd.; "Comparison of the Organic Flash Cycle (OFC) to Other Advanced Vapor Cycles for Intermediate and High Temperature Waste Heat Reclamation and Solar Thermal Energy"; 2012; 213-223.

Translation of the International Preliminary Report on Patentability mailed on Oct. 8, 2015 in corresponding application No. PCT/JP2014/000258 which is related to U.S. Appl. No. 14/772,045.

\* cited by examiner

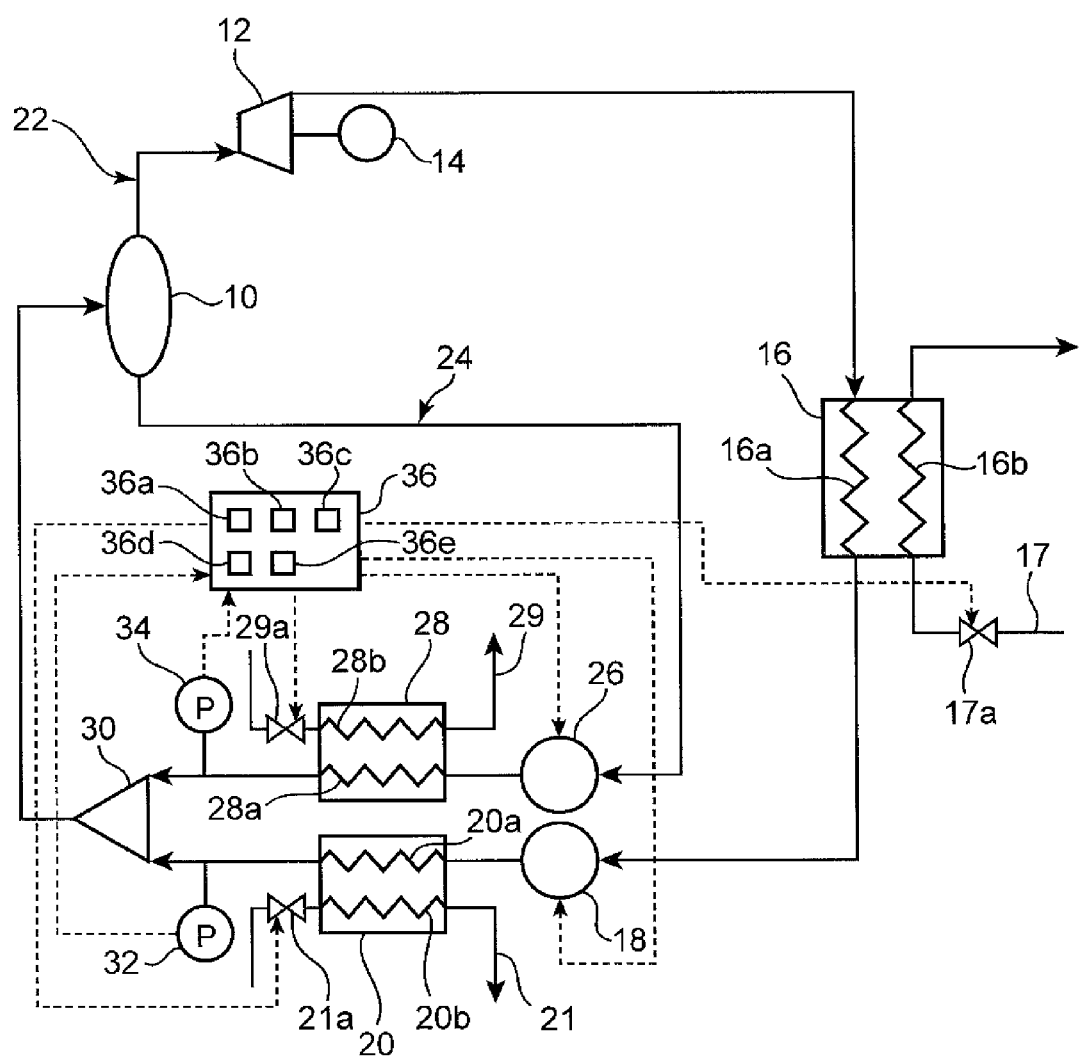

WASTE HEAT RECOVERY APPARATUS

TECHNICAL FIELD

The present invention relates to a waste heat recovery apparatus utilizing a flash cycle.

BACKGROUND ART

Heretofore, a waste heat recovery apparatus utilizing a flash cycle has been known. For example, FIG. 3 of the following Non-Patent Literature 1 discloses a waste heat recovery apparatus which comprises: a gas-liquid separator; an expander into which a gaseous working medium separated by the gas-liquid separator flows; an electricity generator connected to the expander; an expansion valve operable to expand a liquid working medium separated by the gas-liquid separator; a mixer for mixing the working medium discharged from the expander and the working medium after passing through the expansion valve; a condenser operable to condense the mixed working medium from the mixer; a pump operable to pressurize the working medium condensed by the condenser; and an evaporator operable to evaporate the working medium pressurized by the pump.

In the waste heat recovery apparatus described in the Non-Patent Literature 1, the liquid working medium separated by the gas-liquid separator passes through the expansion valve before merging with the working medium discharged from the expander. In this process, the liquid working medium is adiabatically expanded. That is, in this waste heat recovery apparatus, heat energy of the liquid working medium is discarded during the process in which the liquid working medium passes through the expansion valve. Moreover, in this waste heat recovery apparatus, the discarded heat energy of the liquid working medium is not effectively recovered. Thus, a rate of recovery as motive power in the expander, i.e., electricity generation efficiency in the electricity generator, is not sufficient.

CITATION LIST

Non Patent Literature

Non-Patent Literature 1: Tony Ho, and two other coauthors, "Comparison of the Organic Flash Cycle (OFC) to other advanced vapor cycles for intermediate and high temperature waste heat reclamation and solar thermal energy", Energy, June 2012, Vol. 42, p. 213-222

SUMMARY OF INVENTION

An object of the present invention is to provide a waste heat recovery apparatus capable of enhancing a rate of recovery as motive power in an expander thereof.

The waste heat recovery apparatus according to one aspect of the present invention includes: a gas-liquid separator; an expander into which a gaseous working medium separated by the gas-liquid separator flows; a driven machine connected to the expander; a condenser operable to condense the working medium discharged from the expander; a first pump operable to pressurize the working medium discharged from the condenser; a first heater operable to heat the working medium pressurized by the first pump; a circulation flow passage for serially connecting the gas-liquid separator, the expander, the condenser, the first pump and the first heater in this order; a heat recovery flow passage for allowing a liquid working medium discharged from the gas-liquid separator to merge with the working medium flowing in a portion between the first heater and the gas-liquid separator in the circulation flow passage; and a second pump provided in the heat recovery flow passage and operable to pressurize the working medium flowing through heat recovery flow passage.

BRIEF DESCRIPTION OF DRAWINGS

FIG. 1 is a diagram illustrating an outline of a configuration of a waste heat recovery apparatus according to one embodiment of the present invention.

DESCRIPTION OF EMBODIMENTS

With reference to FIG. 1, a waste heat recovery apparatus according to one embodiment of the present invention will be described. This waste heat recovery apparatus is a type utilizing a flash cycle.

As illustrated in FIG. 1, the waste heat recovery apparatus comprises: a gas-liquid separator (flash drum) 10; an expander 12 into which a gaseous working medium separated by the gas-liquid separator 10 flows; a driven machine 14 connected to the expander 12; a condenser 16 operable to condense the working medium discharged from the expander 12; a first pump 18 operable to pressurize the working medium discharged from the condenser 16; a first heater 20 operable to heat the working medium pressurized by the first pump 18; and a circulation flow passage 22 for serially connecting the gas-liquid separator 10, the expander 12, the condenser 16, the first pump 18 and the first heater 20 in this order. The waste heat recovery apparatus further comprises: a heat recovery flow passage 24 for allowing a liquid working medium discharged from the gas-liquid separator 10 to merge with the circulation flow passage 22; a second pump 26 provided in the heat recovery flow passage 24; a second heater 28 operable to heat the working medium pressurized by the second pump 26; a mixer 30 joining the heat recovery flow passage 24 and the circulation flow passage 22 together; a first sensor 32; a second sensor 34; and a control device 36.

The gas-liquid separator 10 is provided in the circulation flow passage 22. A working medium flows into the gas-liquid separator 10 in a saturated liquid state or a slightly superheated state. The gas-liquid separator 10 is operable to separate the working medium introduced therein, into a gaseous working medium (saturated gas) and a liquid working medium (saturated liquid). Specifically, the working medium flowing into the gas-liquid separator 10 undergoes pressure loss, thereby causing separation into a gaseous working medium and a liquid working medium. As the working medium, it is preferable to use water (water vapor), a hydrocarbon-based medium (such as methane, ethane, propane, isobutane, propylene, benzene or xylene), and a fluorocarbon-based medium having less negative influence on global warming (such as HFC134a, HFC152a or HFC245fa). In this embodiment, one selected from these working medium is used.

The expander 12 is provided at downstream portion of the gas-liquid separator 10 in the circulation flow passage 22. The expander 12 includes a rotor configured to be rotationally driven by expansion energy of the gaseous working medium discharged from the gas-liquid separator 10. More specifically, the expander 12 comprises a casing internally formed with a rotor chamber, and a pair of male and female screw rotors (the rotor) rotatably supported inside the rotor chamber. In this embodiment, the screw rotors are configured to be rotationally driven by expansion energy of the working medium supplied into the rotor chamber via an intake port formed in the casing. Then, the working medium expanded inside the rotor chamber and thereby reduced in pressure is discharged from a discharge port formed in the casing into the circulation flow passage 22.

The driven machine 14 is connected to the expander 12. In this embodiment, an electricity generator 14 is employed as the driven machine 14. The electricity generator 14 is configured to be driven interlockingly with the screw rotors rotationally driven according to expansion of the gaseous working medium within the expander 12. Specifically, the electricity generator 14 is equipped with a rotary shaft connected to one of the pair of screw rotors of the expander 12, and configured to generate electricity according to rotation of the rotary shaft along with rotation of the one screw rotor.

The condenser 16 is provided at downstream portion of the expander 12 in the circulation flow passage 22. The condenser 16 is operable to condense the gaseous working medium discharged from the expander 12, into a liquid working medium. Specifically, the condenser 16 comprises a working medium passage 16a for allowing the gaseous working medium to pass therethrough, and a cooling medium passage 16b for allowing an cooling medium supplied from the outside to pass therethrough. The cooling medium passage 16b is connected to a cooling medium supply passage 17 for externally supplying a cooling medium to the condenser 16. The cooling medium supply passage 17 is provided with a cooling valve 17a for adjusting an amount of the cooling medium to be permitted to flow into the cooling medium passage 16b. The working medium being flowing through the working medium passage 16a is condensed by heat exchange with the cooling medium being flowing through the cooling medium passage 16b. Examples of the cooling medium to be permitted to flow through the cooling medium passage 16b include cooling water or air.

The first pump 18 is provided at downstream portion of the condenser 16 in the circulation flow passage 22. The first pump 18 is operable to pressurize the working medium condensed by the condenser 16 to a given pressure, and discharge the pressurized working medium to a downstream region of the circulation flow passage 22 with respect to the first pump 18. As the first pump 18, it is possible to employ, for example, a centrifugal pump equipped with an impeller serving as a rotor, and a gear pump comprising a rotor composed of a pair of gears. The first pump 18 is capable of being driven at an arbitrary rotational speed.

The first heater 20 is provided at downstream portion of the first pump 18 (a portion between the first pump 18 and the gas-liquid separator 10) in the circulation flow passage 22. The first heater 20 is operable to heat the working medium discharged from the first pump 18. Specifically, the first heater 20 comprises a working medium passage 20a for allowing the working medium to pass therethrough, and a first heating medium passage 20b for allowing a heating medium supplied from the outside to pass therethrough. The first heating medium passage 20b is connected to a first heating medium supply passage 21 for externally supplying a heating medium to the first heater 20. The first heating medium supply passage 21 is provided with a first valve 21a for adjusting an amount of the heating medium to be permitted to flow into the first heating medium passage 20b. The working medium being flowing through the working medium passage 20a is heated by heat exchange with the heating medium being flowing through the first heating medium passage 20b. In this process, the working medium may be heated by the first heater 20 in such a manner as to become a slightly superheated state. Examples of the heating medium to be supplied to the first heating medium passage 20b include steam or hot water.

The heat recovery flow passage 24 is designed to allow the liquid working medium discharged from the gas-liquid separator 10 to merge with the working medium flowing in a portion between the first heater 20 and the gas-liquid separator 10, more specifically, the mixer 30, in the circulation flow passage 22.

The second pump 26 is provided at downstream portion of the gas-liquid separator 10 in the heat recovery flow passage 24. The second pump 26 is operable to pressurize the liquid working medium separated by the gas-liquid separator 10 to a given pressure, and discharge the pressurized working medium to a downstream region of the heat recovery flow passage 24 with respect to the second pump 26. The second pump 26 has a configuration fundamentally identical to that of the first pump 18.

The second heater 28 is provided at downstream portion of the second pump 26 (a portion between the second pump 26 and the mixer 30) in the heat recovery flow passage 24. The second heater 28 has a configuration fundamentally identical to that of the first heater 20. Specifically, the second heater 28 comprises a working medium passage 28a for allowing the working medium to pass therethrough, and a second heating medium passage 28b for allowing a heating medium supplied from the outside to pass therethrough. The second heating medium passage 28b is connected to a second heating medium supply passage 29 for externally supplying a heating medium to the second heater 28. The second heating medium supply passage 29 is provided with a second valve 29a for adjusting an amount of the heating medium to be permitted to flow into the second heating medium passage 28b. The working medium being flowing through the working medium passage 28a is heated by heat exchange with the heating medium being flowing through the second heating medium passage 28b. Examples of the heating medium to be supplied to the second heating medium passage 28b include steam or hot water.

The mixer 30 is configured to mix therein the working medium flowing through the circulation flow passage 22 after being heated by the first heater 20, and the working medium flowing through the heat recovery flow passage 24 after being heated by the second heater 28. That is, a position at which the mixer 30 is provided in the circulation flow passage 22 serves as a merging point at which the heat recovery flow passage 24 merges with the circulation flow passage 22. The mixed working medium from the mixer 30 are introduced into the gas-liquid separator 10 via the circulation flow passage 22. It should be understood that the mixer 30 may be omitted. In this case, a downstream end of the heat recovery flow passage 24 may be directly connected to the circulation flow passage 22.

The first sensor 32 is a pressure sensor operable to detect a pressure of the working medium flowing through the circulation flow passage 22. The first sensor 32 is provided at a portion between the first heater 20 and the mixer 30 in the circulation flow passage 22. That is, the first sensor 32 is operable to detect a pressure of the working medium heated by the first heater 20.

The second sensor 34 is a pressure sensor operable to detect a pressure of the working medium flowing through the heat recovery flow passage 24. The second sensor 34 is provided at a portion between the second heater 28 and the mixer 30 in the heat recovery flow passage 24. That is, the second sensor 34 is operable to detect a pressure of the working medium heated by the second heater 28.

The control device 36 is connected to each of the cooling valve 17a, the first valve 21a, the second valve 29a, the first pump 18, the second pump 26, the first sensor 32 and the second sensor 34. The control device 36 comprises a cooling valve control section 36a for adjusting a degree of opening of the cooling valve 17a, a first-pump control section 36b for adjusting a rotational speed of the first pump 18, a first-valve control section 36c for adjusting a degree of opening of the first valve 21a, a second-pump control section 36d for adjusting a rotational speed of the second pump 26, and a second-valve control section 36e for adjusting a degree of opening of the second valve 29a. Each of the control sections 36a to 36e is operable to control a respective one of the control targets in such a manner as to allow a detection value of the first sensor 32 and a detection value of the second sensor 34 to become substantially equal to each other.

For example, when the detection value of the second sensor 34 is less than that of the first sensor 32, the control device 36 performs at least one of the following control operations (1) and (2).

(1) The second-pump control section 36d operates to increase the rotational speed of the second pump 26 in such a manner as to allow the detection value of the second sensor 34 to become approximately equal to that of the first sensor 32.

(2) The second-valve control section 36e operates to increase the degree of opening of the second valve 29a in such a manner as to allow the detection value of the second sensor 34 to become approximately equal to that of the first sensor 32.

Alternatively, when the detection value of the second sensor 34 is less than that of the first sensor 32, the control device 36 may perform at least one of the following control operations (3) to (5).

(3) The cooling valve control section 36a operates to reduce the degree of opening of the cooling valve 17a in such a manner as to allow the detection value of the first sensor 32 to become approximately equal to that of the second sensor 34.

(4) The first-pump control section 36b operates to reduce the rotational speed of the first pump 18 in such a manner as to allow the detection value of the first sensor 32 to become approximately equal to that of the second sensor 34.

(5) The first-valve control section 36c operates to reduce the degree of opening of the first valve 21a in such a manner as to allow the detection value of the first sensor 32 to become approximately equal to that of the second sensor 34.

Alternatively, when the detection value of the second sensor 34 is less than that of the first sensor 32, the control device 36 may perform any appropriate combination of two or more of the above control operations (1) to (5). On the other hand, when the detection value of the second sensor 34 is greater than that of the first sensor 32, the control device 36 may perform a control operation reverse to a respective one of the above control operations (1) to (5).

Next, a drive operation of the waste heat recovery apparatus according to this embodiment will be described.

A working medium flowing into the gas-liquid separator 10 is separated into a gaseous working medium (saturated gas) and a liquid working medium (saturated liquid) by the gas-liquid separator 10.

The gaseous working medium flowing into the expander 12 is expanded within the expander 12. That is, a motive power is extracted in the expander 12. In this embodiment, the electricity generator 14 is driven by the motive power. The working medium discharged from the expander 12 is condensed by the condenser 16 and then pressurized by the first pump 18. After the working medium is pressurized to a given pressure by the first pump 18, the pressurized working medium is heated to a given temperature by the first heater 20.

On the other hand, the liquid working medium separated by the gas-liquid separator 10 is pressurized to a given pressure by the second pump 26 and then heated to a given temperature by the second heater 28.

Then, the working medium discharged from the first heater 20 and the working medium discharged from the second heater 28 are mixed together by the mixer 30.

In this situation, under control of the control device 36, a pressure of the working medium in the circulation flow passage 22 at a position just before the mixer 30 (a pressure between the first heater 20 and the mixer 30) and a pressure of the working medium in the heat recovery flow passage 24 at a position just before the mixer 30 (a pressure between the second heater 28 and the mixer 30) are controlled to become approximately equal to each other. Thus, it becomes possible to reduce an exergy loss which would otherwise occur during mixing of the two working medium in the mixer 30.

Then, the mixed working medium from the mixer 30 is re-introduced into the gas-liquid separator 10 via the circulation flow passage 22.

As described above, in the waste heat recovery apparatus according to this embodiment, a liquid working medium discharged from the gas-liquid separator 10 is pressurized by the second pump 26 to compensate for a reduction in pressure caused during the separation in the gas-liquid separator 10, and then mixed with the working medium in a position between the first heater 20 and the gas-liquid separator 10 in the circulation flow passage 22. That is, the liquid working medium is mixed with the working medium in the circulation flow passage 22 almost without losing its own heat energy in the heat recovery flow passage 24. This makes it possible to enhance a rate of recovery as motive power in the expander 12.

In this embodiment, the second heater 28 is provided at a portion between the second pump 26 and the mixer 30 in the heat recovery flow passage 24. Thus, the working medium in the heat recovery flow passage 24 is heated by the second heater 20, so that it becomes possible to reduce an amount of heating by the first heater 20 and therefore facilitate downsizing of the first heater 20. It also becomes possible to reduce a temperature difference between respective working medium in the circulation flow passage 22 and the heat recovery flow passage 24 before mixing of the two working medium, and therefore reduce the exergy loss which would otherwise occur during the mixing of the two working medium. This makes it possible to further enhance the rate of recovery as motive power in the expander 12.

In this embodiment, the control device 36 is operable to perform a control operation of allowing a pressure of the working medium flowing from the circulation flow passage 22 into the mixer 30 and a pressure of the working medium flowing from the heat recovery flow passage 24 into the mixer 30 to become substantially equal to each other. Thus, respective pressures of the two working medium just before the mixer 30 become substantially equal to each other. Thus, it becomes possible to further reduce the exergy loss which would otherwise occur during the mixing of the two working medium.

It should be noted that the embodiment disclosed herein is shown by way of illustration in every respect but not meant to be construed in a limiting sense. The scope of the present invention should be determined by the appended claims and their legal equivalents, instead of the above description of embodiments, and any changes and modifications of the embodiment may be included therein, unless otherwise they depart from the scope of the present invention.

For example, although the above embodiment has been described based on an example where the second heater 28 is provided in the heat recovery flow passage 24, the second heater 28 may be omitted. In this case, the second-valve control section 36e of the control device 36 may also be omitted. However, in this case, an amount of heating by the first heater 20 needs to be increased to compensate for a lack of heating of the working medium in the heat recovery flow passage 24. This causes an increase in size of the first heater 20. Moreover, a temperature difference occurs between the working medium flowing from the circulation flow passage 22 into the mixer 30 and the working medium flowing from the heat recovery flow passage 24 into the mixer 30, so that an exergy loss occurs during mixing of between the two working medium, thereby causing deterioration in the rate of recovery as motive power in the expander 12. In contrast, in this embodiment where the second heater 28 is provided in the heat recovery flow passage 24, it becomes possible to achieve both downsizing of the first heater 20 and reduction in the exergy loss which would otherwise occur during the mixing of the two working medium.

Further, although the above embodiment has been described based on an example where a pressure sensor is employed as each of the first sensor 32 and the second sensor 34, a temperature sensor may be employed as each of the sensors.

Further, in the above embodiment, a positive displacement screw expander has been exemplified as the expander 12. Alternatively, a centrifugal expander may be employed as the expander 12.

Further, the above embodiment has been described based on an example where the control device 36 controls control targets in such a manner as to allow a detection value of the first sensor 32 and a detection value of the second sensor 34 to become substantially equal to each other. However, in a situation where both of a flow rate of heating medium to be supplied to each of the first heater 20 and the second heater 28 and a flow rate of cooling medium to be supplied to the condenser 16 are abundant, the cooling valve 17a, the first valve 21a and the second valve 29a may be omitted to allow each of the heating medium and the cooling medium to be supplied to a respective one of the heater (20, 28) and the condenser 16 in a possibly large amount. In this case, the control sections for controlling the valves may also be omitted.

The above embodiment will be outlined here.

The waste heat recovery apparatus according to the above embodiment comprises: a gas-liquid separator; an expander into which a gaseous working medium separated by the gas-liquid separator flows; a driven machine connected to the expander; a condenser operable to condense the working medium discharged from the expander; a first pump operable to pressurize the working medium discharged from the condenser; a first heater operable to heat the working medium pressurized by the first pump; a circulation flow passage for serially connecting the gas-liquid separator, the expander, the condenser, the first pump and the first heater in this order; a heat recovery flow passage for allowing a liquid working medium discharged from the gas-liquid separator to merge with the working medium flowing in a portion between the first heater and the gas-liquid separator in the circulation flow passage; and a second pump provided in the heat recovery flow passage and operable to pressurize the working medium flowing through heat recovery flow passage.

In the waste heat recovery apparatus according to the above embodiment, a liquid working medium discharged from the gas-liquid separator is pressurized by the second pump, and then mixed with the working medium flowing in a portion between the first heater and the gas-liquid separator in the circulation flow passage. That is, the liquid working medium is mixed with the working medium of the circulation flow passage almost without losing its own heat energy in the heat recovery flow passage. This makes it possible to enhance a rate of recovery as motive power in the expander.

Preferably, the waste heat recovery apparatus according to the above embodiment further comprises a second heater provided at a portion between the second pump and a merging point of the circulation flow passage and the heat recovery flow passage, in the heat recovery flow passage, and operable to heat the working medium pressurized by the second pump.

In this case, it becomes possible to reduce a temperature difference between respective working medium in the circulation flow passage and the heat recovery flow passage before mixing of the two working medium, and therefore reduce an exergy loss which would otherwise occur during the mixing of the two working medium. This makes it possible to further enhance the rate of recovery as motive power in the expander. In addition, the working medium in the heat recovery flow passage can be heated by the second heater, so that it becomes possible to facilitate downsizing of the first heater.

More preferably, the waste heat recovery apparatus further comprises a control device operable to perform a control operation of allowing a pressure of the working medium flowing from the circulation flow passage into the merging point, and a pressure of the working medium flowing from the heat recovery flow passage into the merging point, to become substantially equal to each other.

In this case, the respective pressures of the two working medium before the merging point become substantially equal to each other, so that it becomes possible to further reduce the exergy loss which would otherwise occur during the mixing of the two working medium.

The invention claimed is:
1. A waste heat recovery apparatus comprising:
  a gas-liquid separator;
  an expander into which a gaseous working medium separated by the gas-liquid separator flows;
  a driven machine connected to the expander;
  a condenser which condenses the working medium discharged from the expander;
  a first pump which pressurizes the working medium discharged from the condenser;
  a first heater which heats the working medium pressurized by the first pump;
  a circulation flow passage for serially connecting the gas-liquid separator, the expander, the condenser, the first pump and the first heater in this order;
  a heat recovery flow passage for allowing a liquid working medium discharged from the gas-liquid separator to merge with the working medium flowing in a portion between the first heater and the gas-liquid separator in the circulation flow passage; and a second pump provided in the heat recovery flow passage and which pressurizes the working medium flowing through heat recovery flow passage.

2. The waste heat recovery apparatus as recited in claim 1, further comprising:
a second heater provided at a portion between the second pump and a merging point of the circulation flow passage and the heat recovery flow passage, in the heat recovery flow passage, and which heats the working medium pressurized by the second pump.

3. The waste heat recovery apparatus as recited in claim 2, further comprising:
a control device which performs a control operation of allowing a pressure of the working medium flowing from the circulation flow passage into the merging point, and a pressure of the working medium flowing from the heat recovery flow passage into the merging point, to become substantially equal to each other.

4. The waste heat recovery apparatus as recited in claim 1, wherein all of the liquid working medium discharged from the gas-liquid separator flows through the heat recovery passage to the second pump.

\* \* \* \* \*